Dec. 2, 1947.  R. L. MEYER  2,431,819
CARGO LASH FASTENER
Filed May 25, 1944  2 Sheets-Sheet 1

INVENTOR.
ROBERT L. MEYER
BY
Morton S. Brockman

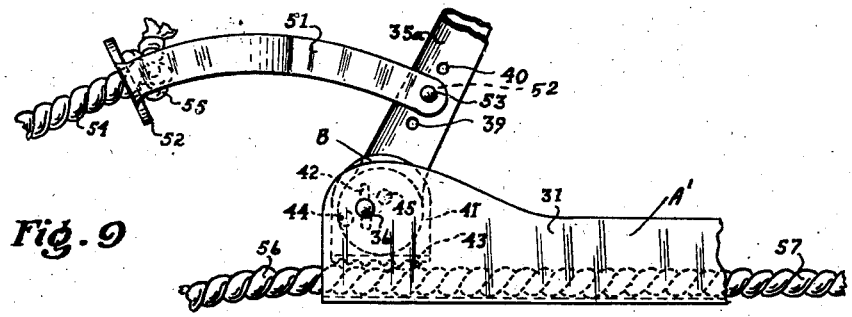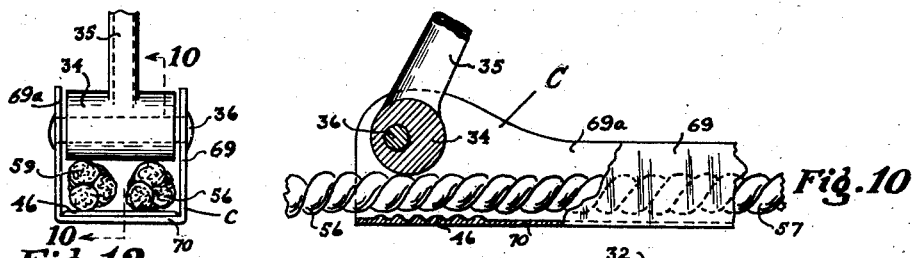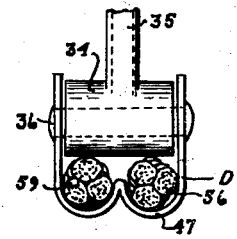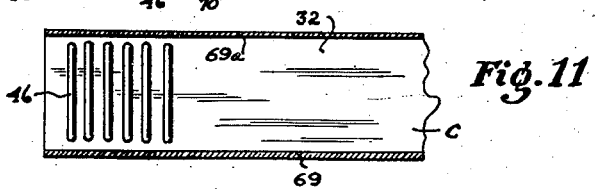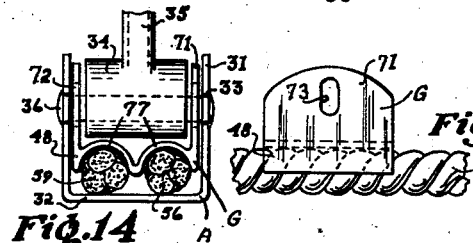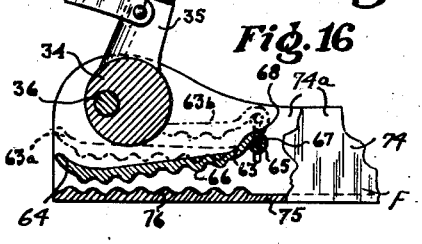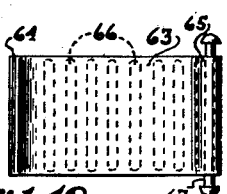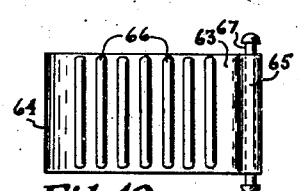

Patented Dec. 2, 1947

2,431,819

UNITED STATES PATENT OFFICE 2,431,819

CARGO LASH FASTENER

Robert L. Meyer, East Cleveland, Ohio

Application May 25, 1944, Serial No. 537,373

6 Claims. (Cl. 24—134)

This invention relates to apparatus used to secure miscellaneous cargo on vehicles or ships, and relates particularly to a rope type lash used for tying down boxes, crates and other articles in freight-carrying air liners.

The primary object of this invention is to facilitate and speed up the securing of shiftable cargo in airplanes, gliders and similar transports.

Another object is to provide a type of device mentioned which is adaptable for use with any type of load, regardless of the size or shape of the objects to be tied, and which will speed up the unlashing and discharge of such cargo, or any part thereof, at its destination.

A further object is to provide a one-piece, easy to operate unit which is relatively light in weight and which conserves rope.

These and other objects of the invention will become apparent from a reading of the following specifications and claims, together with the accompanying drawing, in which like parts are referred to and indicated by like reference characters, and wherein:

Figure 9 is a view similar to that of Figure 8 but showing certain refinements which make the device adjustable and adaptable for either light or heavy line and for increasing or decreasing its effective operating leverage;

Figure 10 is a side view, partly in section taken on line 10—10 of Figure 12, of a part of the buckle member and showing a first modified form of construction thereof;

Figure 11 is a plan view of the bottom part of the buckle member showing certain transverse corrugations therein for engaging the line;

Figure 12 is an end view of the form of device shown in the Figure 10;

Figure 13 is a view similar to that of the Figure 12 showing two longitudinal channels in the bottom of the buckle member instead of corrugations;

Figure 14 is a view similar to that of the Figure 4 and showing two longitudinal channels in the movable plate member instead of corrugations;

Figure 15 is a side elevation of the movable plate member shown in the Figure 14;

Figure 16 is a side elevation, partly in section, of a modified form of buckle member adaptable for use with this novel device;

Figure 17 is a view similar to that of the Figure 16 but showing the device engaging a section of line and in its closed position;

Figure 18 is a top plan view of the floating plate used in the device shown in Figures 16 and 17;

Figure 19 is a bottom view of the floating plate shown in Figure 18.

Figure 1:
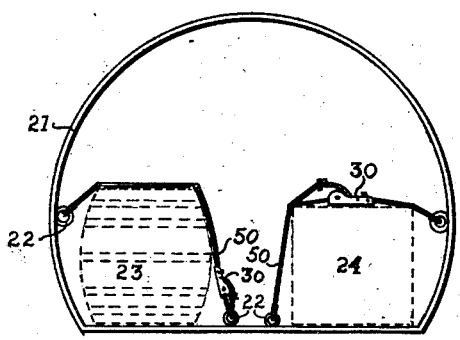
Figure 1 is a comprehensive view of the improved lash retaining cargo in a freight-carrying plane.

Referring to the drawings, the sheet 1 shows one form of the device. The Figure 1 is a comprehensive view showing how the instant devices are applied over a barrel 23 or over a box 24 in order to keep them from shifting during transit. In this figure, anchoring devices on the lines 50 are connected to the fixed eyelets or rings 22 which are a permanent part of the ship or vehicle 21. This view also shows how the buckle member 30 of the device may be applied almost anywhere over or around the article to be held. That is, it may conveniently rest on the cargo as on the case 24 or be away from it as from the barrel 23.

Broadly, the device consists of two main elements. First, there is the buckle member 30 and second, the line member 50. Each of these parts will be described in detail and in the order mentioned.

The buckle member 30 may be formed of durable, lightweight sheet metal. It has a rather straight, flat longitudinal bottom 32 from which rise the two upright parallel walls 31, 31a. The space between the walls 31 and 31a should be about an inch or an inch and a quarter, or should be wide enough to accommodate two widths of line of the weight and diameter of line intended to be used with the device. The portions of the side walls 31 toward the left as viewed in the drawings are slightly higher than the portions in the middle and right sections. The high wall portions facilitate the mounting of the hereinafter described clamp elements and the low wall portions tend to make quick manipulation easier. The wall portions 31 and 31a have aligned holes 33 therein which accommodate the pivot pin 36 used to mount the clamp elements. The walls 31, 31a have, near the right-hand end of the buckle member 30, as viewed in the drawings, two aligned holes for receiving a second pivot pin 38 on which the hereinafter described lever lock 37 is mounted to swing.

The buckle, shown on Sheet 1 of the drawings, has herein been designated as A, to distinguish from the buckles illustrated in the figures on Sheet 2. The buckle A comprises a channel member 30 having a bottom 32 from which the side walls 31 and 31a rise.

The buckle member A may be between six and eight inches long, if light or medium weight rope is to be used, or longer if heavy rope is to be used with the device.

The portion of the buckle referred to as the clamp elements consists of a cam roller 34 which oscillates on an off-center axis on pivot pin 36, and a U-shaped plate member B. The cam roller 34 has an operating handle or lever 35 attached thereto which is so positioned that when the cam roller is in its lowest position in the channel of the buckle member and exerting maximum pressure on the rope within the buckle, the handle 35 will be substantially parallel to the base or bottom 32 of the buckle. When the operating handle 35 is in an upward or open position, the cam roller 34 is then away from the bottom 32 and the line or rope 50 therein is then free to slide in either direction through the buckle.

Mounted on the pivot pin 36, to move vertically, is a U-shaped plate B comprising a bottom 29 and two upstanding laterally spaced legs 41 and 41a, which legs have vertical slots 42 in them for receiving the pivot pin 36. The plate member B is mounted on the pivot pin 36 with its bottom 29 between the cam 34 and the bottom 32 of the buckle member and bears against the upper surfaces of the strands of rope within the buckle. The lower surface of the bottom 29 is provided with transverse corrugations 43 which tightly engage the line or rope 50 when the cam 34 has been moved to clamp the strands in the buckle.

Figure 7:
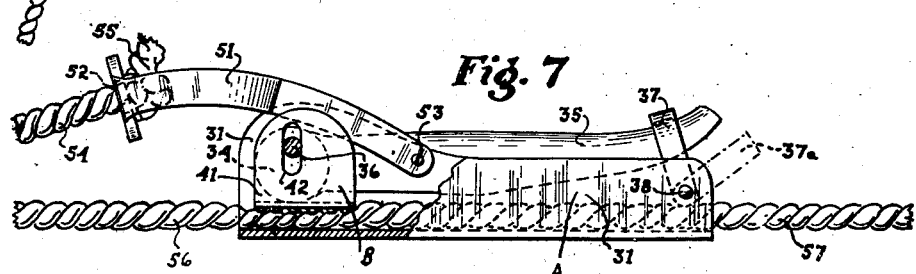
Figure 7 is an enlarged side elevation, partly in section, of the buckle member of the device and showing it in its closed position.
Figure 8:
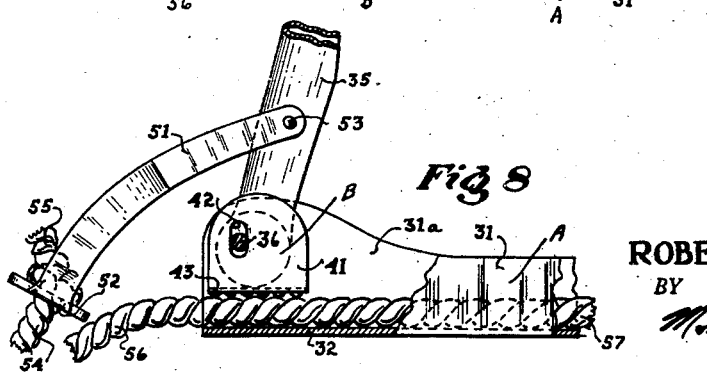
Figure 8 is a view similar to that of the Figure 7 and showing the device in its open position and is a section taken on line 8—8 of Figure 4.

For locking or latching the handle 35 in closed position, which position is the one it occupies when the cam has been moved to tightly engage the strands of rope in the buckle, as illustrated in Figure 7, a lock device 37 is provided. This lock device is illustrated as consisting of a U-shaped piece of metal which has its ends pivoted to a second pivot pin 38 extending through suitably disposed apertures or holes in the side walls 31, 31a of the buckle.

For a purpose to be later explained, a clevis 51 is attached to the handle or lever 35 with its free ends pivoted to the lever by a pin 53, passing through suitable apertures in the ends of the clevis and in the handle 35. The bend or folded portion of the clevis is provided with an aperture 52 for a purpose to be later explained. In side elevation the clevis is curved longitudinally, as shown in the drawings, so that when the handle 35 is in closed position, as shown in Figure 7, the bend or folded part of the clevis 51 will be near the strands passing through the buckle. The line or rope 50 may be any standard rope or line of suitable weight or size. A loop portion is formed in the line with the loop passing through the buckle between its bottom 32 and the bottom 29 of the plate member B, which loop portion is shown in the drawings and designated by reference characters 57 and 58. This loop carries an attaching member or hook 61 which is adapted to be engaged with a ring 22 or other fixed support in the vehicle in which the cargo is to be lashed. A portion of the strand 57 which extends from the other end of the buckle A, and designated at 56, is bent back on itself, as at 54, and its end is passed through the hole 52 in the clevis 51 and there knotted as at 55, thus securing this end of the rope or line to the buckle. This second loop is provided with a second attaching member or anchor 62 which is adapted to engage another ring 22 or other fixed attaching means mounted in the vehicle. That portion of the line designated by the reference character 59 is sometimes herein referred to as the free end of the line. It will be observed that this end extends from the same end of the buckle as does the portion 56 of the other strands, as heretofore described.

Figures 4, 5, 6:
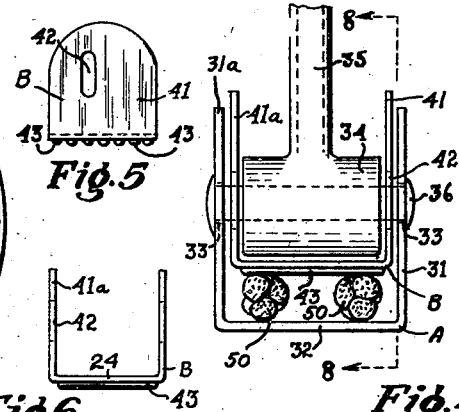
Figure 4 is an enlarged end view of the device.
Figure 5 is a side view of a movable plate member used in the device.
Figure 6 is an end view of the movable plate member shown in the Figure 5.
Figure 2:
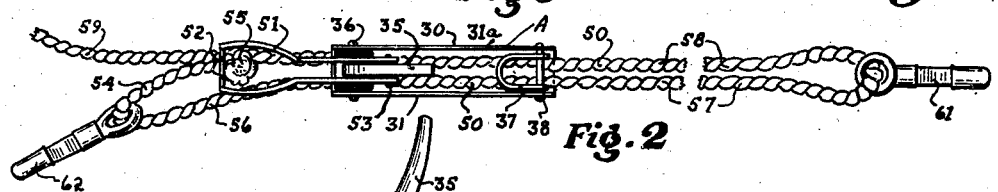
Figure 2 is a plan view of the preferred form of device.
Figure 3:
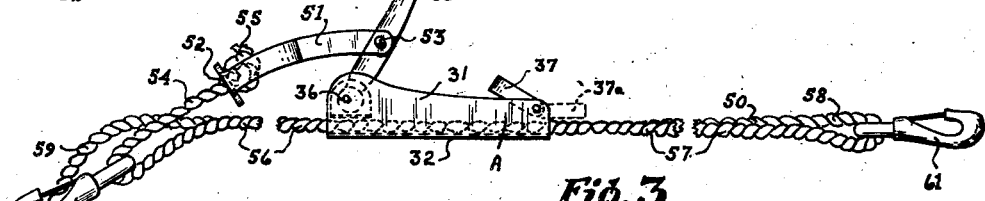
Figure 3 is a side elevation of the device shown in the Figure 2.

In operation, the anchors 61 and 62, with the line or rope 50 through them, as illustrated in Figure 6, are attached to spaced eyelets or rings 22 on the vehicle. The handle or lever 35 of the buckle is raised to the released position, which is that shown in Figure 3. The operator then grasps the free end 59 of the line and pulls it as tight as he can which thus tightens the line between the hooks 61 and 62. Retaining his hold on the free end 59 of the line, and holding it tight, the operator then moves the lever or handle 35 in clockwise direction as viewed in Figure 3 to the position shown in Figure 7. This movement of the lever or handle 35 moves the cam 34 to urge the plate B down against the strands of the rope within the channel body of the buckle, holding these strands against endwise movement and at the same time foreshortening the loop through the hook 62, thereby decreasing the distance between the hooks 61 and 62 to apply the pull or final tug which is necessary to cinch the line about the cargo to prevent shifting of the cargo as the vehicle travels.

It will be observed that initiation of movement of the handle or lever 35 clamps the strands within the buckle fixedly to prevent endwise movement of these strands with respect to the buckle, in either direction, and as the lever is pushed home, to the closed position of Figure 7, the pressure of the cam and plate B increases against the strands and at the same time the loop through the hook 62 is foreshortened.

It will be noted that the combination of the present invention provides a cargo lash in which clamp means are provided for holding the strands of the lash line against movement, when the line has been tightened by hand to its limit, and in addition gives an added pull or tug to the line to decrease the distance between the attaching hooks, beyond that possible by hand pull, to cinch the lashing about the cargo to prevent its shift.

Figure 9 illustrates a buckle similar to that described heretofore, which buckle is designated as A'. In this arrangement the pivot pin 36, instead of rigidly engaging apertures in the walls 31, 31a of the channel body 30 of the buckle, is loose in the walls. The walls are provided with a plurality of registering apertures 33, 44 and 45 so that the position of the pivot pin 36 may be adjusted to move the cam 34 up or down in the buckle to accommodate rope or line of different diameters. This figure, in addition, discloses means for adjusting the mounting of the clevis 51 on the handle 35a. The handle is provided with a plurality of holes 39, 52 and 40 through any one of which the pivot pin 53 may be passed to vary the position of the clevis 51 on the handle. This adjustment of the clevis is provided so that the degree of final pull or tug, in foreshortening the loop through the hook 62, may be varied to meet conditions at hand.

If it is desired to foreshorten the loop through the hook 62, a maximum amount, then the pivot pin 53 would be inserted through the aperture 40 in the handle 35a. The minimum amount of foreshortening would be accomplished by inserting the pivot pin 53 through the aperture 39 in the handle.

*First modified form*

The first modified form of the invention is shown in Figures 10, 11 and 12, which is simpler than the form shown on sheet 1 of the drawings. In the form of the invention shown in Figures 10, 11 and 12, the buckle C is of channel shape, having a bottom 70 and side walls 69 and 69a. The pivot pin 36 passes through suitable apertures in the side walls, carries the cam 34 and its handle 35, as heretofore described. The interior surface of the bottom 70 is corrugated at 46 to increase the holding engagement between the buckle and the rope when the cam 34 is tightened against the rope. In this form of the invention the U-shaped plate B is omitted, the cam 34 acting directly against the rope.

Figures 13, 14 and 15 show a variation of arrangement over the forms heretofore described.

In Figure 13 the buckle member D is provided with two longitudinally extending channels 47, each of which receives a strand of the rope. In this form, the cam 34 acts against the strands in the channels 47, pressing the strands against the channel surfaces to hold the rope against movement.

In the form shown in Figure 14, the channel member is designated as A, being the channel member of the form shown on sheet 1. In this arrangement a plate G has its lower margin formed with two longitudinally extending channels 77 which bear against the upper surfaces of the strands of the rope within the buckle. The plate G has upstanding side portions 71 and 72 suitably apertured to receive the pivot pin 36. In this form of the invention the cam 34 acts directly against the convex surfaces of the channels 77 in pushing the plate G downwardly in the buckle, to clamp the rope strands against endwise movement in the buckle.

Figure 15 is a side view of the plate G of Figure 14 and shows the slot 73 for receiving the pivot pin 36.

*Second modified form*

What is herein termed as a second modified form, is illustrated in Figures 16, 17, 18 and 19. In these views, the buckle member is designated as F having a bottom 75 and upstanding side walls 74 and 74a. The side walls are apertured to receive pivot pin 36 for securing the roller 34 in place in the buckle. The bottom 75 of the buckle member is on its interior surface provided with a plurality of transverse corrugations 76. A floating plate 63 is pivoted by a pin 67 between the walls 74 and 74a of the buckle. The plate extends between the cam 34 and the bottom 75 of the buckle and has its under surface corrugated at 66. The corrugations 66 of the plate and of the bottom of the buckle are staggered so that the strands of line or rope between them are firmly held against movement without damage to the strands. The free end of the plate 63 is upturned at 64 for convenience in inserting the strands 57 and 58 in the buckle between the bottom and the plate. Figure 17 illustrates the manner in which the strands are inserted between the bottom of the buckle and the plate, and shows the parts with the strands firmly clamped in the buckle and the handle or lever 35 in closed position. While it is not shown in Figures 16 and 17, the latch or lock 37 is provided, at the right-hand end of the buckle, to hold the lever 35 in closed position, which is that occupied by it as illustrated in Figure 7.

The provision of the plate 63, with the corrugations on its under surface, affords a large surface engagement between the plate and strands, when the buckle is locked against the strands, to prevent any movement of the strands with respect to the buckle. Furthermore, the provision of the corrugations as illustrated, enables biting engagement between the plate and the corrugated bottom of the buckle and strands without cutting any of the fibers of the strands.

Figure 16 illustrates, in dotted lines, various positions of the plate 63. In Figure 16, the side walls are provided with a plurality of apertures through which the pivot or pintle pin 67 may pass, to vary the distance between the pivot pin and the bottom of the buckle, to accommodate the buckle to rope or line of different diameters. Figure 17 shows slots 68 in the side walls, for the pintle pins 67 to allow for vertical movement of the plate 63 to accommodate itself to ropes or lines of different diameters.

Among the many advantages possessed by the present invention, may be mentioned a few. Rope hitches and knot tying are completely eliminated. Every unit is completely assembled, making it very easy to apply the buckle. The buckle may be slid anywhere along the lashing line so as to be placed in a manner convenient for easy operation. It makes possible a very quick lashing of cargo, which is highly desirable in airplane transportation, adjustments may be quickly made, and if any slack occurs in any of the lines, during travel, the slack may be quickly taken up by an operator. It is unnecessary to tie or untie knots. Because of the fact that a complete unit consists of one buckle and a length of line or rope, carrying two attaching hooks, any number may be utilized for securely lashing cargo in place for transportation.

Heretofore cargo has been lashed in airplanes, by crossing and crisscrossing lengths of line or rope, tying knots, and relying solely on the strength of the operator to tighten the rope sufficiently to hold the cargo against shifting.

The present device is one in which the line or rope may be readily substituted, if any should become worn, can accommodate any length of line or rope, and accommodated to rope or line of different diameters, within the maximum space limits between the bottoms of the buckle members and the cams. While the device of the present invention is designed primarily to lash cargo in airplanes, it may be used for towing planes or for other purposes wherein it is necessary to tightly cinch a line or rope to accomplish the purpose at hand.

It will, of course, be understood that various details of construction may be varied through a wide range without departing from the principles of this invention, and it is, therefore, not the purpose to limit the patent granted hereon otherwise than necessitated by the scope of the appended claims.

I claim:

1. A rope lash comprising a channel-shaped buckle member having a bottom and two side walls, a pivot pin supported by said walls above the bottom, a cam oscillatable on said pin, a handle for oscillating said cam, a plate pivoted at one end to said side walls and extending between said cam and the bottom of said buckle member and having its other end free and bent away from the buckle member bottom, the confronting surfaces of said bottom and said plate being corrugated with the corrugations of the plate staggered with respect to the corrugations of the bottom to hold rope against slippage without damaging the rope, a clevis connected at one end to said handle and at its other end connected to one end of a strand of rope which is within said buckle for forming a loop in said strand and moving said rope end toward said buckle to foreshorten the loop as said handle is moved to clamp the rope in said buckle, and means pivoted to said side walls for engaging said handle when the cam is moved to clutching position to prevent movement of the handle in release direction.

2. Means for cinching a cargo lash to prevent cargo shift which means include a buckle having a channel-shaped body to receive two strands of rope which form a first loop engaging one lash fastener, a plate pivoted in said channel to overlie said two strands, a cam in said channel operable to force said plate into holding engagement with said two strands, a handle for moving said cam in the manner stated, hook means for preventing movement of said handle and cam away from holding engagement, a clevis pivoted on said handle and having connected to it one end of one of the strands in said buckle to form a second loop for engaging a second fastener, said last mentioned loop being foreshortened as the cam and handle are moved to holding engagement with the two strands in said buckle.

3. Means for cinching a cargo lash to prevent cargo shift which means include a buckle having a channel-shaped body to receive two strands of line which form a loop engaging one lash fastener, a plate pivoted in said channel to overlie said two strands, a cam in said channel operable to force said plate into holding engagement with said strands, a handle for moving said cam, a clevis pivoted to said handle and having connected to it one end of one of the strands in said buckle to form a second loop engaging a second fastener, said last mentioned loop being foreshortened as said cam and handle are moved to holding engagement with the strands in said channel, and a swingable latch on said buckle movable over the handle when it has been moved to cause maximum pressure of cam engagement against said plate to prevent the pull imposed on said handle by said foreshortened loop from moving the handle and cam to released or unlocked position.

4. A cargo lash comprising a line looped through two spaced hooks, a buckle having a channel-shaped body to receive two strands forming one of said loops, a cam oscillatable in said channel to clamp said two strands against the bottom of the channel, a handle for moving said cam, a clevis pivoted to said handle, a strand of said line forming said second loop being attached to said clevis, and means carried by said buckle for holding said handle against displacement when it has been moved to clamp the said strands against the bottom of said channel, the construction being such that when the line is tightened by hand to take up all slack, movement of the handle to clamp the two strands in said body causes said clevis to foreshorten said second loop to cinch the connection between said two hooks.

5. A lashing comprising a first anchor, a line slidably looped through said first anchor and having two strands extending from the first anchor, a buckle receiving both strands therethrough, a second anchor for slidably receiving one of the strands projecting from the buckle, a clamp on said buckle, a handle for operating said clamp to lock and release the strands in the buckle, a clevis pivoted at one end to said handle, the end of said one strand being connected to the bend of the clevis to form a loop in said one strand, said other strand having a free end portion projecting from the buckle and adapted to be manually pulled for initially tightening the line between the anchors before the strands are locked in the buckle, the movement of said handle to strand clamping position foreshortening the loop in said one strand to increase the tautness of the line between said two anchors over and above the tautness created by the manual pulling of the free end of said other strand.

6. A cargo lash or the like comprising a first anchor, a line slidably threaded through said first anchor and having first and second strands extending from the anchor, a buckle receiving the first and second strands of the line therethrough, said first strand having a free end portion extending from the buckle, a second anchor, said second strand having an end portion extending from said buckle and slidably threaded through the second anchor to provide an end beyond the second anchor, means for locking and releasing the strands in the buckle, an actuator for said means, a clevis pivoted at one end to said actuator, the end of said second strand being connected to the bend of the clevis to form a loop in said second strand, the free end portion of said first strand adapted to be manually pulled for initially tightening the line between the anchors before the first and second strands are locked in the buckle, whereby cargo or the like is quickly and tightly lashed by pulling the free end portion of the first strand for initially tightening the line and thereafter by moving the actuator to effect locking of the strands in the buckle by said means while effecting a further tightening of the line by foreshortening the loop in said second strand.

ROBERT L. MEYER.

REFERENCES CITED

The following references are of record in the file of this patent:

UNITED STATES PATENTS

| Number | Name | Date |
|---|---|---|
| 334,878 | Manners et al. | Jan. 26, 1886 |
| 1,434,802 | Bear | Nov. 7, 1922 |
| 864,530 | Garber | Aug. 27, 1907 |
| 1,105,624 | Davis | Aug. 4, 1914 |
| 928,367 | De Witt | July 20, 1909 |
| 1,656,113 | Herman | Jan. 10, 1928 |
| 2,063,681 | Jaworski | Dec. 8, 1936 |
| 805,631 | Chapman | Nov. 28, 1905 |